UNITED STATES PATENT OFFICE.

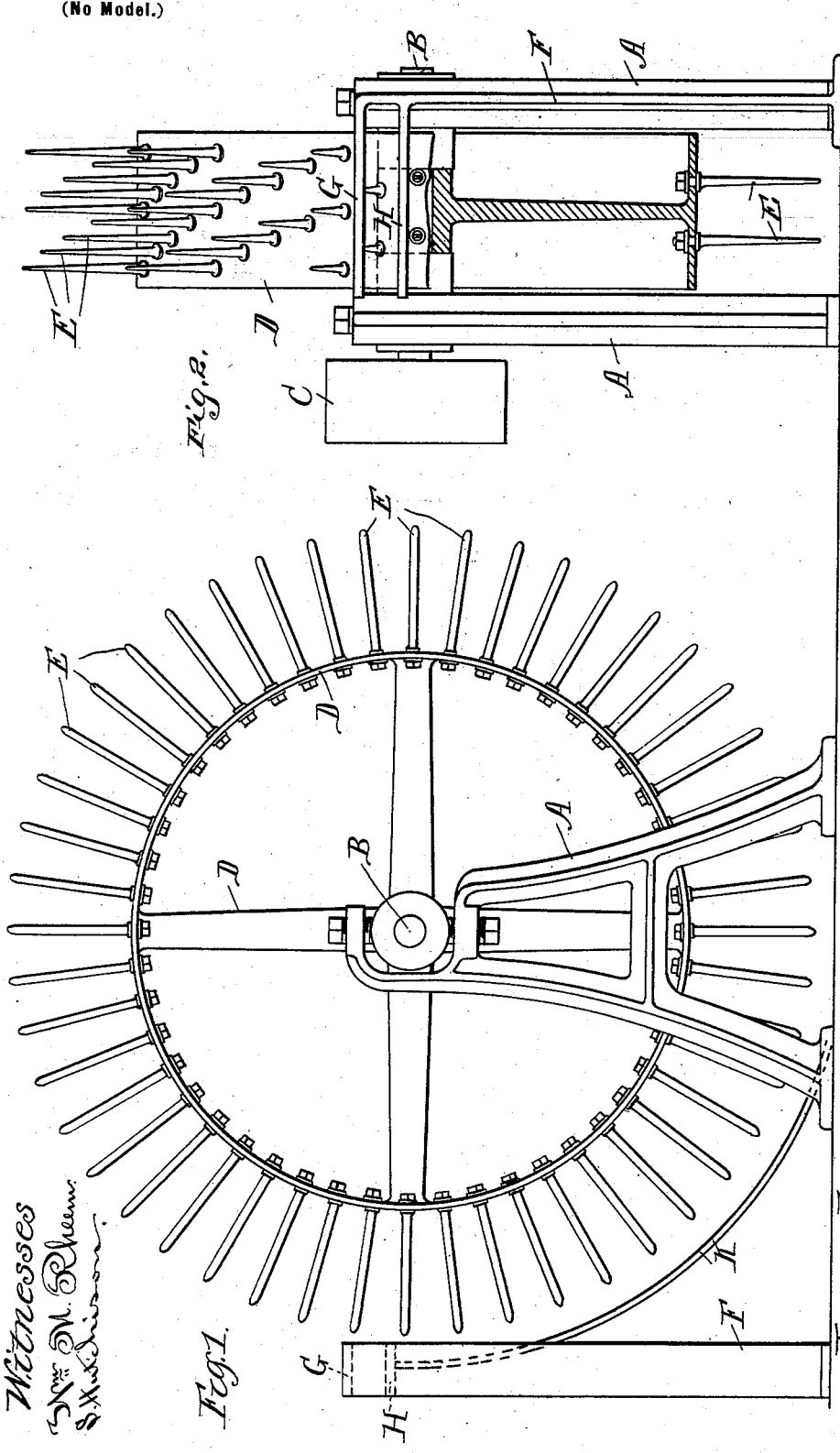

GEORGE A. LOWRY, OF CHICAGO, ILLINOIS, ASSIGNOR TO THE NORTH-WESTERN GRASS TWINE COMPANY, OF ST. PAUL, MINNESOTA.

APPARATUS FOR PREPARING GRASS.

SPECIFICATION forming part of Letters Patent No. 654,990, dated July 31, 1900.

Application filed January 8, 1897. Serial No. 618,448. (No model.)

*To all whom it may concern:*

Be it known that I, GEORGE A. LOWRY, a citizen of the United States, residing at Chicago, in the county of Cook and State of Illinois, have invented a new and useful Apparatus for Preparing Grass for Grass-Twine-Making Machines, of which the following is a specification.

This invention relates to apparatus for preparing grass for grass-twine-making machines.

The object of the invention is to provide means for combing the grass preparatory to forming the same into twine.

The invention consists, substantially, in the construction, combination, location, and relative arrangement of parts, all as will be more fully hereinafter set forth, as shown in the accompanying drawings, and finally specifically pointed out in the appended claims.

In the accompanying drawings, Figure 1 is a view in side elevation of an apparatus embodying the principles of my invention. Fig. 2 is an end view of the same, partly in vertical transverse section.

Reference-letter A designates suitable standards, in which is suitably journaled a shaft B, adapted to receive rotary motion through pulley C from any convenient source of power. Upon shaft B is mounted a carrier D, which in the form shown comprises a wheel, a central web, and flanges extending laterally on opposite sides from the periphery thereof, as clearly shown in Fig 20. In the periphery of carrier D and arranged to project radially therefrom are the tapering spikes or pins E. These spikes or pins are arranged in the periphery of carrier D out of peripheral alinement with each other—that is, each of said spikes or pins is arranged out of peripheral alinement with the preceding and succeeding pin or spike. This may be accomplished by arranging the spikes in parallel rows diagonally across the periphery of the carrier. Arranged in front of the carrier and to one side of but in proximity to the path traversed by the projecting pins or spikes when said carrier is actuated is a bracket F, having at its upper end the projecting arms G H, arranged to extend transversely of the path of travel of the projecting pins or spikes and forming an open-ended support for the material and at the same time serving as a guard for preventing injury to the hands of the operator when the material is presented by hand to the action of the comber.

K designates a fender-plate arranged to extend below the receptacle formed by arms G H in order to protect the operator from danger of injury from the projecting pins or spikes.

In preparing grass preparatory to forming the same into twine it is important that the grass be combed in order that the straws or stems thereof may be free from tangles and will lie as nearly parallel with each other as possible. In order to secure this result, I introduce by hand or otherwise the grass to be prepared into the space between the projecting arms G H, the ends of the handful of grass being presented toward the periphery of the carrier. Then by actuating the carrier, as by imparting a rapid rotary movement to the wheel D, the projecting tapering pins or spikes E effect a combing of the grass thus submitted to the action thereof. I first present the butt-ends and then reverse the material, so as to also comb the tops of the grass, thereby freeing the same of weeds, tangles, and interlacing and leaving the grass in proper condition to be formed into grass twine.

From the foregoing description it will be seen that I provide an exceedingly simple and efficient apparatus for the purpose stated, one that does not require special care or attention and which can be operated to effect a combing of the grass by boys or unskilled labor, as all that is necessary to be done is to present the grass into the guard or holder formed by the arms G H.

A machine such as above described is specially intended for preparing grass to be introduced to the grass-twine-making machine set forth and described in my application for patent executed of even date herewith.

While I have shown and described a specific form and arrangement of apparatus embodying the principles of my invention, which is the best form in which I at present contemplate carrying my invention into practical operation, I desire it to be understood that I do not limit or confine myself to the specific details of construction and arrangement shown and described, as many variations therefrom and changes therein would readily suggest themselves to persons skilled in the art and still fall within the spirit and scope of my invention; but, Having now set forth the object and nature of my invention and a form of operative means embodying the same, what I claim as new and useful and of my own invention, and desire to secure by Letters Patent of the United States, is—

1. In a machine for combing marsh or other grass, a wheel and means for rotating the same, in combination with substantially-blunt pins or spikes arranged to project radially from the periphery of said wheel in parallel rows arranged diagonally across said periphery, and operating to comb and straighten the stalks of grass when presented thereto, and means for supporting the material to be operated on longitudinally in the path of travel of the ends of said pins or spikes, as and for the purpose set forth.

2. In a machine for combing marsh or other grass, a carrier and means for actuating the same, in combination with substantially-blunt pins or spikes arranged to project from the peripheral surface of such carrier, said pins or spikes being arranged in staggered relation to each other and operating, when said carrier is actuated, to enter the mass of material being operated on, and comb and straighten the same, and means for supporting the material to be operated on longitudinally in the path traversed by the projecting ends of said spikes or pins, as and for the purpose set forth.

3. In a machine for combing marsh or other grass, a carrier, and means for actuating the same, in combination with substantially-blunt pins or spikes arranged to project from the surface thereof in staggered relation to each other and operating, when said carrier is actuated, to enter the mass of material being operated on and comb and straighten the same, a bracket arranged to one side of the plane in which said carrier moves, and bars mounted on said bracket and projecting therefrom transversely across the plane of travel of the carrier, said bars being separated from each other, thereby forming an open-sided box or pocket adapted to receive and support the material being operated on longitudinally in the plane of travel of the carrier, as and for the purpose set forth.

In witness whereof I have hereunto set my hand, this 6th day of January, 1897, in the presence of the subscribing witnesses.

GEORGE A. LOWRY.

Witnesses:
S. HUTCHISON,
S. E. DARBY.